US012666306B2

(12) United States Patent
Plancherel et al.

(10) Patent No.: US 12,666,306 B2
(45) Date of Patent: Jun. 23, 2026

(54) AGGREGATED RF REPORTS FROM A DISPLACEMENT INPUT DEVICE

(71) Applicant: Logitech Europe S.A., Lausanne (CH)

(72) Inventors: Laurent Plancherel, Lausanne (CH); Philippe Chazot, Saint-Jorioz (FR)

(73) Assignee: Logitech Europe S.A., Lausanne (CH)

( * ) Notice: Subject to any disclaimer, the term of this patent is extended or adjusted under 35 U.S.C. 154(b) by 329 days.

(21) Appl. No.: 18/504,969

(22) Filed: Nov. 8, 2023

(65) Prior Publication Data

US 2025/0150898 A1 May 8, 2025

(51) Int. Cl.
H04W 28/06 (2009.01)
G06F 3/038 (2013.01)

(52) U.S. Cl.
CPC .......... H04W 28/065 (2013.01); G06F 3/038 (2013.01); *G06F 2203/0384* (2013.01)

(58) Field of Classification Search
CPC .. H04W 28/065; G06F 3/038; G06F 3/03543; G06F 3/0383; G06F 2203/0384
See application file for complete search history.

(56) References Cited

U.S. PATENT DOCUMENTS

| | | | |
|---|---|---|---|
| 6,542,149 B1 | 4/2003 | Chung | |
| 7,702,284 B2 | 4/2010 | Palin et al. | |
| 7,856,248 B1 | 12/2010 | Fujisaki | |
| 9,100,177 B2 | 8/2015 | Dangui et al. | |
| 11,604,522 B1 * | 3/2023 | Su ........................... | G06F 3/038 |

| | | | |
|---|---|---|---|
| 2004/0189603 A1 | 9/2004 | Arrigo et al. | |
| 2005/0020225 A1 * | 1/2005 | Lazzarotto ........... | H04B 1/0067 |
| | | | 455/226.1 |
| 2012/0069798 A1 | 3/2012 | Vitthaladevuni et al. | |
| 2013/0290803 A1 | 10/2013 | Busaba et al. | |
| 2013/0301569 A1 | 11/2013 | Wang et al. | |
| 2015/0254193 A1 * | 9/2015 | Priest .................... | G06F 13/385 |
| | | | 710/5 |

(Continued)

FOREIGN PATENT DOCUMENTS

| | | |
|---|---|---|
| CN | 1708781 A | 12/2005 |
| CN | 207924830 U | 9/2018 |

(Continued)

OTHER PUBLICATIONS

U.S. Appl. No. 18/191,826, "Non-Final Office Action", May 28, 2025, 43 pages.

(Continued)

*Primary Examiner* — Farid Seyedvosoghi
(74) *Attorney, Agent, or Firm* — Kilpatrick Townsend & Stockton LLP

(57) ABSTRACT

A method for wireless communications between a displacement input device and a receiver comprises detecting, by the displacement input device, a plurality of displacements in time periods of a first frequency. The plurality of displacements are aggregated in packets at a second frequency, wherein the second frequency is lower than the first frequency. The packets are wirelessly transmitted from the displacement input device to the receiver. The receiver wirelessly receives the plurality of displacements aggregated in packets and buffers them in a memory coupled to the receiver. The receiver transmits, to a host, the plurality of displacements at the first frequency.

20 Claims, 11 Drawing Sheets

(56) References Cited

U.S. PATENT DOCUMENTS

| | | | |
|---|---|---|---|
| 2023/0269609 A1 | 8/2023 | Wang et al. | |
| 2024/0333459 A1* | 10/2024 | Chazot | H04L 5/0044 |

FOREIGN PATENT DOCUMENTS

| CN | 118923186 A | 11/2024 |
|---|---|---|
| EP | 2247071 A1 | 11/2010 |
| EP | 3224980 B1 | 4/2018 |
| JP | 11282622 A | 10/1999 |
| JP | 2015039177 A | 2/2015 |
| JP | 7184351 B2 | 11/2022 |
| KR | 20010039781 A | 5/2001 |
| KR | 20120062767 A | 6/2012 |
| KR | 101897972 B1 | 9/2018 |

OTHER PUBLICATIONS

U.S. Appl. No. 18/191,828, "Non-Final Office Action", Aug. 13, 2025, 12 pages.

Clark, et al., "An Analysis of TCP Processing Overhead", Institute of Electrical and Electronics Engineers Communication Magazine, vol. 27, No. 6, Jun. 1989, pp. 94-101.

Nguyen, et al., "A Survey of Techniques for Internet Traffic Classification Using Machine Learning", Institute of Electrical and Electronics Engineers Communications Surveys & tutorials, vol. 10, No. 4, 2008, 1 pages.

Ono, et al., "A Study on Efficient Coding Methods to Suppress Redundancy and ACK Traffic in LT Codes With Feedback", International conference on Emerging Technologies for Communication, 2022, 4 pages.

Sardar, et al., "A Survey of TCP Enhancement for Last-hop Wireless Networks", Institute of Electrical and Electronics Engineers Communications Surveys & Tutorials, vol. 8, No. 3, Feb. 2006, pp. 20-34.

* cited by examiner

| SOF | Address | Control | HID Payload | MIC | CRC |
|-----|---------|---------|-------------|-----|-----|

FIG. 2A

| # | Field | Description |
|---|-------|-------------|
| 1 | SOF | Start of frame |
| 2 | Address | Address of the message |
| 3 | Control<br>- Length<br>- Flow Control<br>- ACK /NOACK | Packet control field<br>Length of the payload<br>Flow control (ensure no reports are lost or duplicated)<br>Flag indicating an acknowledge is requested on not |
| 4 | HID Payload | Upper layer payload |
| 5 | MIC | Message integrity check (Verify the message has not been altered and correctly encrypted) |
| 6 | CRC | CRC MAC layer (calculated over the address, Packet Control Field, Payload and MIC) |

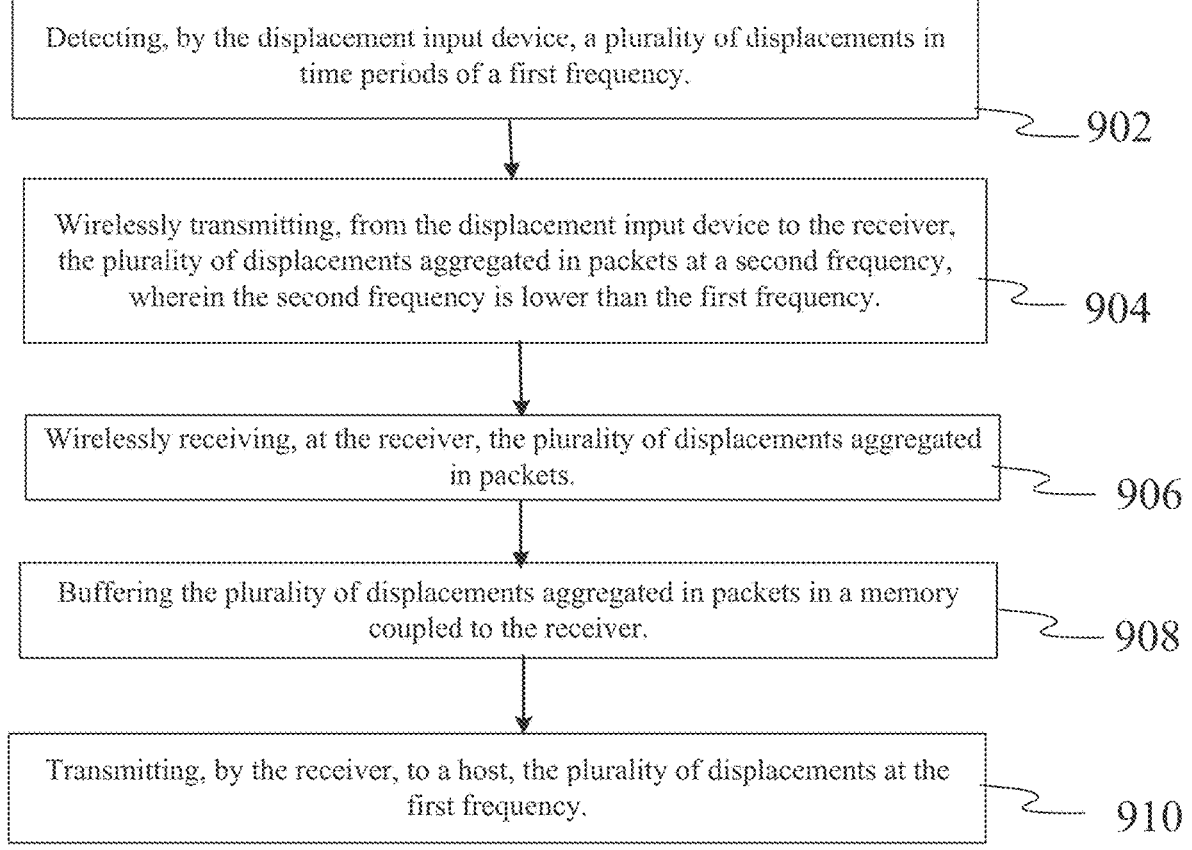

Detecting, by the displacement input device, a plurality of displacements in time periods of a first frequency. — 902

Wirelessly transmitting, from the displacement input device to the receiver, the plurality of displacements aggregated in packets at a second frequency, wherein the second frequency is lower than the first frequency. — 904

Wirelessly receiving, at the receiver, the plurality of displacements aggregated in packets. — 906

Buffering the plurality of displacements aggregated in packets in a memory coupled to the receiver. — 908

Transmitting, by the receiver, to a host, the plurality of displacements at the first frequency. — 910

*FIG. 9*

AGGREGATED RF REPORTS FROM A DISPLACEMENT INPUT DEVICE

CROSS-REFERENCES TO RELATED APPLICATIONS

This application is related to co-pending and co-owned U.S. Non-provisional application Ser. No. 18/191,826 filed on Mar. 28, 2023 titled "WIRELESS COMMUNICATION PROTOCOL FOR EFFICIENT PACKET MANAGEMENT FOR INPUT DEVICES", which is hereby incorporated by reference in its entirety for all purposes.

FIELD

The described embodiments relate generally to displacement input devices (e.g., a computer mouse) in communication with a host device via a wireless receiver (e.g., dongle). More particularly, the present embodiments relate to reducing the number of transmitted packets.

BACKGROUND

Displacement input devices, such as computer mice or joysticks, send a standard packet to a host, chosen and initialized upon connection to a host, with fields for button presses, displacement movement, etc. The transmission of each packet consumes battery power and uses bandwidth. There is a need for faster and more precise position information, and thus more packets, with gaming mice. It would be desirable to limit battery consumption and bandwidth.

Unless otherwise indicated herein, the materials described in this section are not admitted to be prior art by inclusion in this section.

BRIEF SUMMARY OF THE INVENTION

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

In certain embodiments, a method for wireless communications between a displacement input device and a receiver comprises detecting, by the displacement input device, a plurality of displacements in time periods of a first frequency. The plurality of displacements are aggregated in packets at a second frequency, wherein the second frequency is lower than the first frequency. The packets are wirelessly transmitted from the displacement input device to the receiver. The receiver wirelessly receives the plurality of displacements aggregated in packets and buffers them in a memory coupled to the receiver. The receiver transmits, to a host, the plurality of displacements at the first frequency.

In embodiments, there are between two and eight displacements in each packet. In particular, in one implementation, there are two, four or eight displacements in each packet. The receiver can be a USB dongle attached to a USB port of a computer. The displacement input device can be a computer mouse, trackball, joystick, gamepad, steering wheel, touchpad, head mounted display, or other displacement device. The displacements include at least one of x-y displacement data, z-displacement data, wheel rotation data, trackball rotation data, joystick or mini-joystick data, D-pad data, accelerometer data or tilt sensor data.

In embodiments, the method further comprises detecting, by the displacement input device, a button or key activation in time periods of the second frequency. The button or key activation in packets at the same second frequency are wirelessly transmitted from the displacement input device to the receiver. The receiver transmits to the host the button or key activation at the same time as a first displacement of the aggregated displacements (or immediately before or after the first displacement). If a second button or key activation is detected in a same time period of the second frequency as the first mentioned button or key activation, it is held for a subsequent packet for transmission to the receiver, such that only a single button or key activation is included in each packet, limiting packet size.

In some implementations, when only displacement data is detected in a first period of time, a no-acknowledgement packet is generated with the displacement data. The no-acknowledgement packet is wirelessly transmitted to the host. Accumulated displacement data is transmitted in subsequent periods of time when only displacement data is detected, such that an nth period of time no acknowledgement packet includes first displacement data from the first period of time and all displacement data up to the nth period of time. After a threshold number of periods of time with only displacement data, an acknowledgment request is transmitted (this period can vary from few microseconds to multiple seconds depending on the system and performances acceptable for the product).

In certain embodiments, a reduced-size packet is generated without fields not needed for the time period. The reduced-size packet is wirelessly transmitting to the host. In further embodiments, when only displacement data is detected in a period of time, a reduced-size packet is generated with the displacement data while eliminating packet fields corresponding to the other input data. When other input data is detected in the period of time, a data packet for the other input data is generated with a packet field for the other input data and is wirelessly transmitted to the host. The displacement data includes at least one of x-y displacement data, wheel rotation data and cursor button data. In other embodiments, the displacement data includes keyboard cursors, a joystick or mini-joystick, a D-pad or an accelerometer or tilt sensor output, or a steering wheel angle. In embodiments, the "other input data" includes a button or key activation.

In some implementations, a transceiver in communication with the host receives the reduced-size packet and converts the reduced-size packet into a standard packet including fields for the other input data. The standard packet is then transmitted to the host.

BRIEF DESCRIPTION OF THE DRAWINGS

The features of the various embodiments described above, as well as other features and advantages of certain embodiments of the present disclosure will be more apparent from the following detailed description taken in conjunction with the accompanying drawings, in which:

FIG. 2A illustrates packet format, according to certain embodiments. FIG. 2B shows a table 200 showing a packet format for an HID (Human Interface Device) input device, according to certain embodiments.

FIG. 9 is a flowchart illustrating a method of aggregating and dissembling displacements in packets, according to certain embodiments.

DETAILED DESCRIPTION OF THE INVENTION

Aspects of the present disclosure relate generally to displacement input devices, and more particularly to systems and methods for wireless communication protocol having a method for reducing the number of transmitted packets, according to certain embodiments.

In the following description, various examples of communication protocols having a method for determining use of data aggregation are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
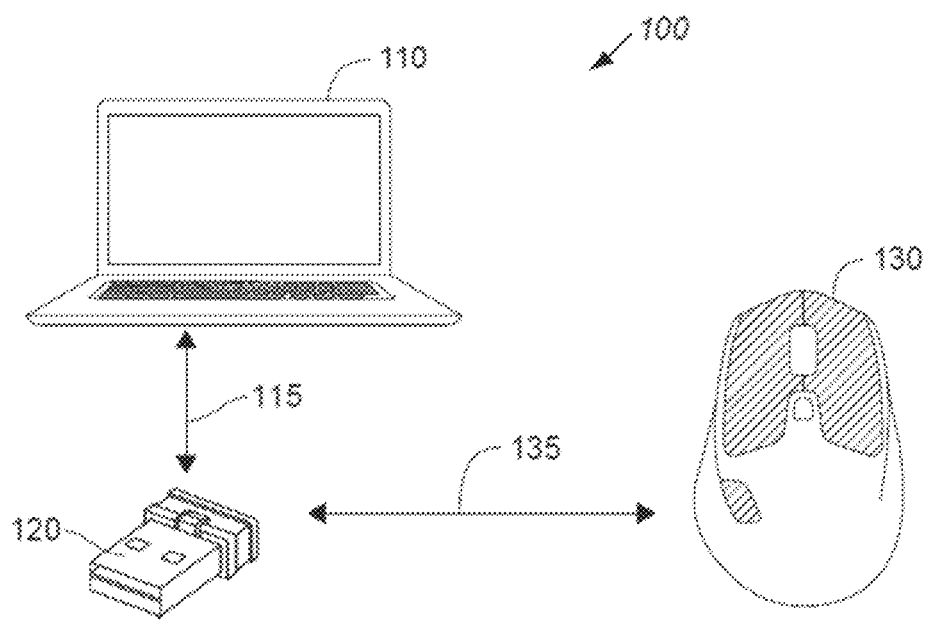
FIG. 1 shows a system including a host computing device that can be coupled to a plurality of peripheral computer devices via a wireless transceiver, according to certain embodiments.

The following high-level summary is intended to provide a basic understanding of some of the novel innovations depicted in the figures and presented in the corresponding descriptions provided below. Aspects of the invention relate to various novel communication protocols having a method for determining use of data aggregation for displacement data that can be well-suited for modern computing systems that run software with demanding operating requirements, such as competitive gaming systems. Over the last few decades, the advent of wireless communication protocols like Bluetooth® and BLE® has spurred innovation in connectivity between host computing devices and computer peripheral devices such that most peripheral devices have migrated from hard-wired connections to the host to wireless connections to the host. In many systems, the wireless communication protocols associated with wireless connections may be implemented over a Universal Serial Bus (USB) connected network, which may include multiple peripheral devices all communicating through a wireless USB hub (e.g., dongle) to a host computer device, as would be appreciated by one of ordinary skill in the art with the benefit of this disclosure (e.g., as shown in FIG. 1).

Although wireless connections offer improved flexibility and convenience for the user, some video game applications require relatively fast player response times and conventional wireless communication protocols (e.g., BLE) often do not provide acceptable performance metrics (e.g., computer mouse report latency and report rate, keystroke report latency and report rate) for the more discerning of gamers in the higher echelons of competitive e-sports.

For example, the delay from the time a user interacts with a mouse to the time the host registers the interaction "latency" is often used as a performance benchmark. A related common performance benchmark is the rate at which the device reports to the host (i.e., "report rate"), which is often desired to be at 1000 reports or more per second. In some embodiments, a wireless human input device (HID) peripheral device transceiver can be configured to wirelessly transfer displacement data between the HID input device and host transceiver using an aggregation or accumulation method.

When a peripheral input device transmits a data packet, it may request an acknowledgement from the transceiver before transmitting the next data packet. This may cause a delay in transmission of the information. Within this disclosure a data construct and associated methods therefore are disclosed that enables a user or a system to speed up communication between the peripheral device and the transceiver, and save bandwidth over the air. Having free RF bandwidth allows the option of sending data from the host to the mouse within the ACK packet.

Figure 7:
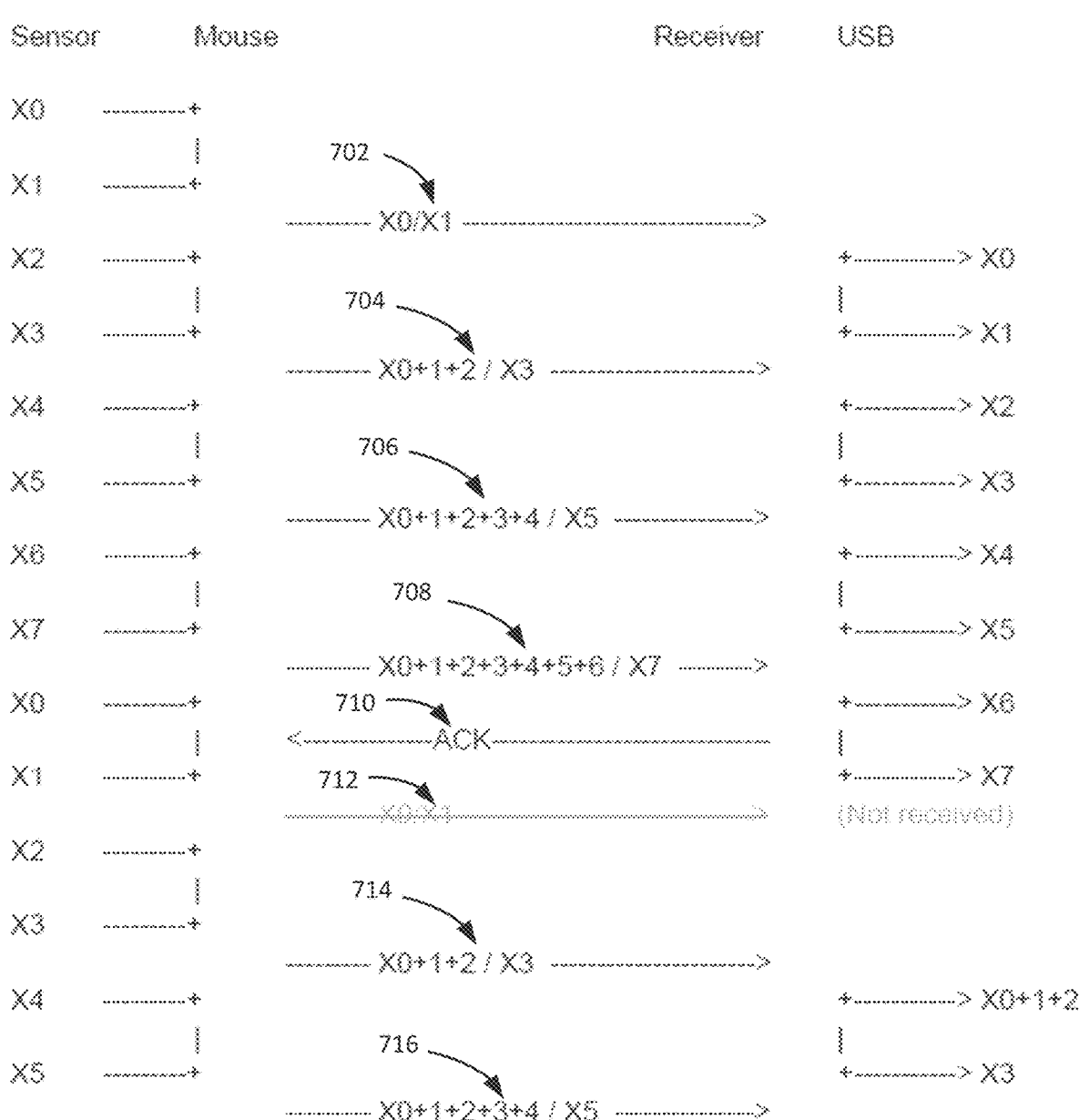
FIG. 7 is a diagram illustrating the aggregation and dissembling of displacements in packets, with two displacements per packet, according to certain embodiments.

More specifically, in some embodiments the peripheral device may transmit data packets, depending on the input data type, without waiting to receive an acknowledgment from the transceiver. As illustrated in FIG. 7, an ACK 710 is sent only after every 4$^{th}$ packet, not for every packet. Embodiments of the disclosure can remove the delay associated with waiting for an acknowledgment from the communication protocol, i.e. data packets can be transmitted from peripheral devices to the transceiver without waiting for an acknowledgment. For example, when the data packets contain only mouse displacement data (X/Y information) or roller data, the data packets may be transmitted without requesting an acknowledgement from the transceiver. In this way, waiting time periods for receipt of acknowledgement can be eliminated. This can save time for the air, speed up data transfer rates and can also have the added benefit of extending battery lifetime. When the data packets contain click data or keys data from, the data packets may be sent requesting an ACK after every packet.

Generally, displacement data may account for more than 99% of all transactions, while mouse clicks and wheel events (click and vertical scrolling) may account for less than 1%. Thus, the vast majority of transactions may be simple displacements.

In gaming applications, button or key press data is desired with low latency, while displacement data is less sensitive. Additionally, high frequency report rates can be faster than the human eye can discern. Thus, when there is only displacement data, embodiments aggregate changes in displacement and send an aggregated packet less often. On the receiving end, the aggregated displacements are disassembled and sent to the host for display at the original sampling rate of the peripheral device. This use of the original sampling rate insures a smoother, fluid movement on the display. By aggregating, fewer transmissions are needed, with the associated headers and other overhead for each packet being thus reduced. This not only extends battery life by consuming less power, but also reduces the risk of collisions with other transmissions.

In addition, since packets are sent less frequently, there are fewer return acknowledgement messages required, reducing the need to process their reception and thus reducing latency, as well as reducing the likelihood of collisions with the acknowledgement messages.

In another embodiment, when there is only displacement data, the packet size is also reduced by making the packet size variable. Packets for displacement data between the HID and the transceiver dongle contain only a packet type field and a small displacement field. The button fields and other fields are eliminated. This reduces the battery power required for 99% of transmissions in gaming and reduces the odds of a collision with another wireless transmission on the same channel.

Wireless Input Device and Host System

FIG. 1 shows a system 100 including host computing device 110 that can be coupled to a plurality of peripheral computer devices 130 (e.g., a computer mouse) via a wireless transceiver 120, according to certain embodiments. Host computer 110 may include any suitable computing device, such as a desktop computer, laptop computer, tablet computer, wearable computing device (e.g., head-mounted display, smart watch, etc.), entertainment/infotainment system, vehicle computing systems, or other suitable computing device. Although one host computing device is shown, one of skill in the art will appreciate that multiple computing devices may be used in the embodiments that follow. For example, each peripheral device may be coupled to multiple host computing devices (e.g., but one at a time). Transceiver 120 can be coupled to host computer via a wired or hardwired connection.

In one embodiment transceiver 120 may be a USB transceiver (also referred to as a "dongle" herein) that is socketed in and coupled to host computer 110. In some embodiments transceiver 120 may be wirelessly coupled to host computer 110 using a Bluetooth®, BLE® or other wireless protocol. In some embodiments mouse 130 may be required to go through an initial "pairing" process with transceiver 120 where they exchange data that can include sharing their addresses, names, and profiles which can be stored in memory. The devices can also share a common secret key, which allows them to "connect" whenever they're within communications range in the future. When a peripheral device is connected to the transceiver, bidirectional communications between the devices can proceed using a data construct as described in more detail below.

In some embodiments, transceiver 120 and mouse 130 (and other peripheral devices, not shown) communicate with each other via a piconet 135, which can also be referred do as a wireless communications path. In FIG. 1 piconet 135 is illustrated as wireless communication path 135 between transceiver 120 and mouse 130. The piconet can be a packet-based protocol as described in more detail below. A piconet can include a master device (transceiver 120) and one or more servant devices (e.g., mouse 130). The master device coordinates communication throughout the piconet. The master device can send data to any of its servant devices and request data from them as well. Servant devices are allowed to transmit to and receive from their master.

Mouse 130 can alternately be any suitable computer peripheral device that provides displacement data, however the examples shown here are typically found in conventional gaming systems. For instance, the peripheral device may be a computer mouse, a gamepad, steering wheel, trackball, digital pen, etc. Each peripheral device can be wirelessly coupled to host computer 110 using a communications protocol that manages the report rate of the peripheral devices as described in more detail below. One of ordinary skill in the art with the benefit of this disclosure would appreciate the many modifications, variations, and alternative embodiments thereof. An input device may be a computer peripheral device, and may be referred to as either herein, as well as a "peripheral input device," "peripheral," or the like. The majority of the embodiments described herein generally refer to computer mouse 130, however it should be understood that a computer peripheral device can be any suitable input/output (I/O) device (e.g., user interface device, control device, input unit, or the like) that may be adapted to utilize the novel embodiments described and contemplated herein.

Packet Format

FIG. 2A illustrates a packet format, according to certain embodiments. Field 1 is a start of frame (SOF) indicator. Field 2 can identify the address. The address may be used to identify a piconet in case multiple users are in the same room. A device will exchange the address with the dongle during the pairing sequence. Field 3 can be control information, with the fields identified in FIG. 2B, including whether an acknowledgement is required. This is followed by the payload (Field 4) with the displacement and button data. Field 5 contains a message integrity check used to verify the message has not been altered and correctly encrypted. Field 6 is the cyclic redundancy check (CRC) for the packet.

FIG. 2B shows a table 200 showing the details of a packet format for an HID input device, according to certain embodiments. More specifically, table 200 shows an example of a packet format used in an optional embodiment that includes a bit for ACK/noACK in the control byte or control field. The ACK/noACK bit indicates whether an ACK is required or not. This can be used if multiple aggregated packets are sent with only displacement data before an ACK is required.

Aggregation

Figure 3:
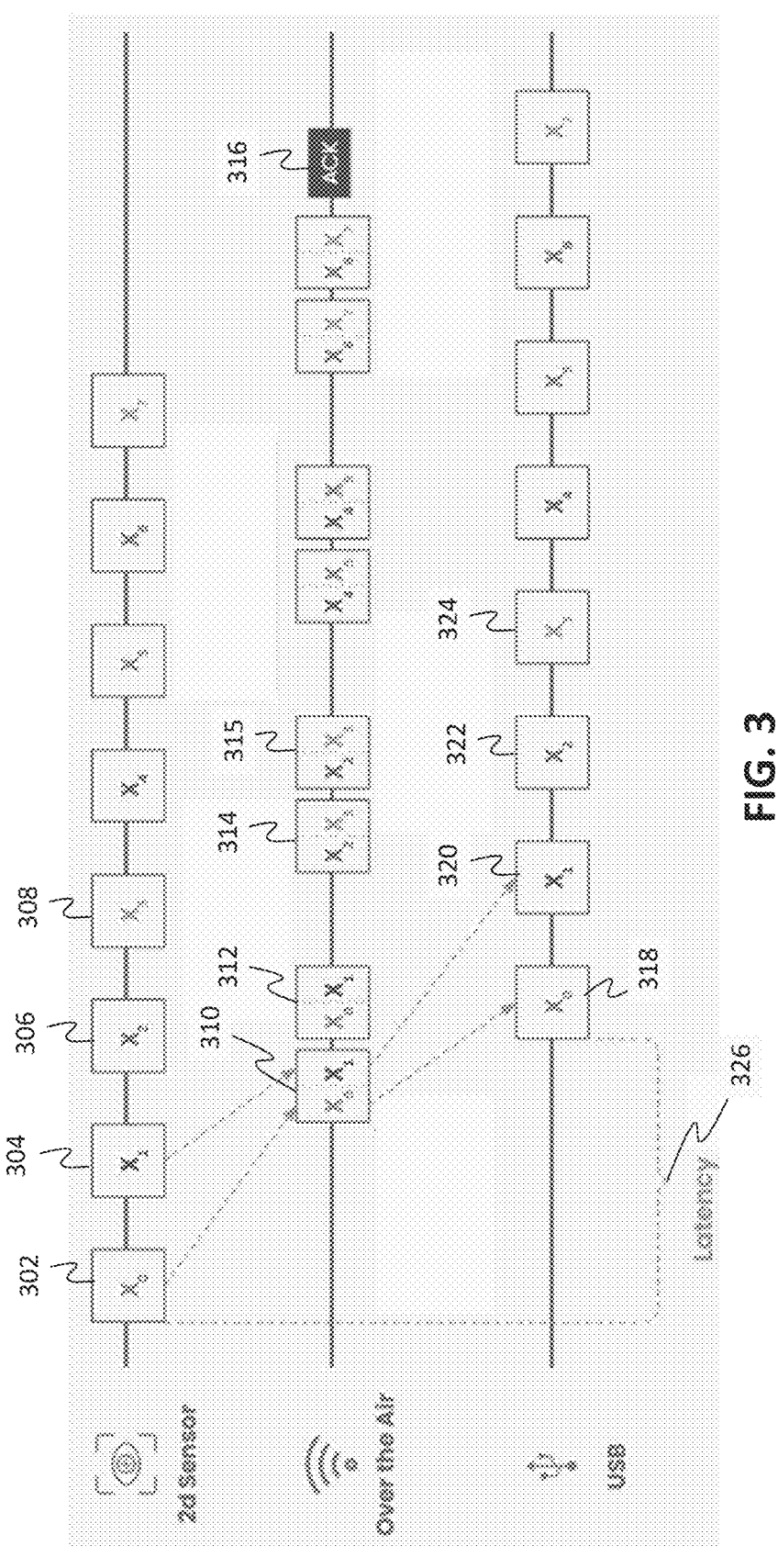
FIG. 3 is a diagram illustrating the aggregation of two displacement reports in one packet, according to certain embodiments.

FIG. 3 illustrates the aggregation of two displacement reports in one packet, according to certain embodiments. A two-dimensional displacement sensor provides a series of displacement reports $X_0$-$X_7$. Normally, each of these would be transmitted wirelessly, over the air, to a receiver, which would then forward them to a host. In embodiments, the packets are aggregated instead. Displacements 302 and 304 ($X_0$ $X_1$) are aggregated into a single packet 310. Similarly, displacements 306 and 308 ($X_2$ $X_3$) are aggregated into a single packet 314.

Instead of sending an acknowledgement after each displacement $X_0$-$X_7$, only a single acknowledgement 316 (ACK) is sent. This further reduces the need for battery power in the peripheral to process the received ACK, and also reduces the number of packets sent over the air, reducing the likelihood of collisions with other transmissions.

Due to the aggregation of displacements and the reduction in the number of acknowledgements, there is an increased amount of available bandwidth. Thus, in one optional embodiment, each aggregated packet can be sent twice, to increase redundancy and thus reduce the number of lost packets in the absence of an ACK, and therefore eliminate the need to resend lost packets. As shown, packets 312 and 315 are examples of such redundant packets for ($X_0$ $X_1$) and ($X_2$ $X_3$), respectively.

Once the aggregated packets 310, 314, etc. are received by a receiver, such as a USB dongle, they are disassembled back into individual displacements 318, 320, 322 and 324, etc. ($X_0$-$X_3$) and transmitted to a host. As can be seen, the aggregation results in a latency 326. Some of this latency is present in any event, due to the time needed to package the displacements into a packet, transmit, receive, and send from the receiver to the host. The elimination of the ACK after each packet reduces the increase in latency. The increased latency is optimally limited by limiting the amount of aggregation so that the latency isn't noticeable to the human eye, and, in particular, to the eye of a video game player. Thus, in embodiments, the amount of aggregation is limited to 2-10 displacements in a packet, in particular 2, 4 or 8 displacements. For the average person, reports at 1 KHz is sufficient, while for gamers, to be safe, 2 KHz is used as a minimum.

Figures 4A, 4B:
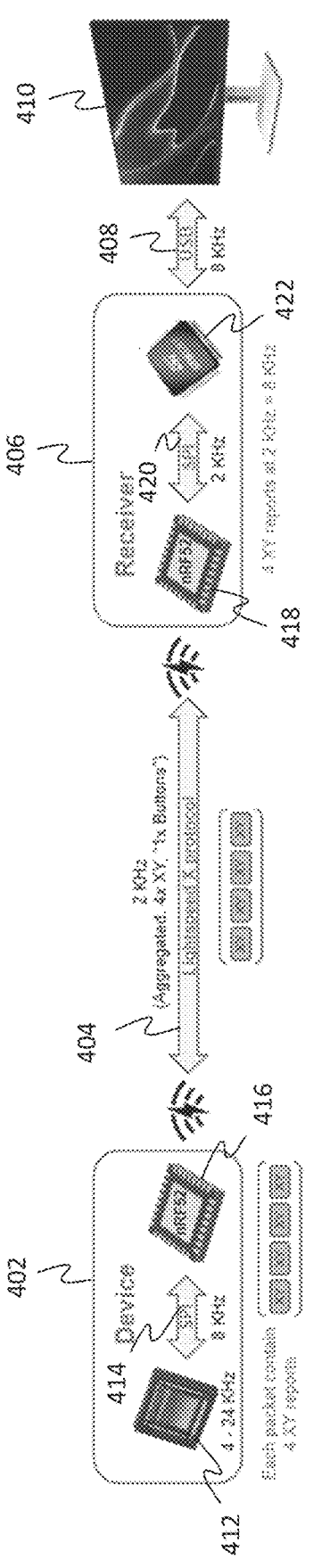
FIGS. 4A-B are diagrams illustrating 4 displacements in a packet, according to certain embodiments.

FIGS. 4A-B are diagrams illustrating 4 displacements in a packet, according to certain embodiments. A displacement input device 402 transmits four aggregated displacements in a packet over a wireless channel 404 to a receiver 406. Receiver 406 disassembles (redistributes or expands) the displacements and transmits them at the original sampling rate over a USB bus 408 to a host 410 for display.

Device 402 (e.g., an optical, wireless computer mouse) has a displacement sensor 412 (e.g., optical sensor) which samples the displacement at 8 KHz and sends it over an internal Serial Peripheral Interface (SPI) 414 to a processor 416 (e.g., a system on a chip). Processor 416 aggregates four displacements into a single packet, as described herein, for transmission over wireless channel 404. Also, any button or key activations are transmitted.

Receiver 406 (e.g., a dongle plugged into a host USB port) has a transceiver/processor 418 (e.g., system on a chip) which receives the packets at 2 KHz and forwards them over an SPI 420 at 2 KHz to a processor 422. Processor 422 disassembles the individual displacements and sends them over a USB bus 408 to host 410 at the original sampling rate of 8 KHz.

FIG. 4B is a graph of displacement (X) versus time (T) for the embodiment of FIG. 4A. The triangles represent the 2 KHz transmissions of 4 aggregated displacements which are represented by the circles. If the 2 KHz signal was sent to the display, there would be a larger, straight line movement between the triangles. By disassembling, there are more movements, with each being smaller, and there are 4 segments instead of one, to more truly follow the curve of the actual displacement device. Thus, a more fluid movement is provided to the display by disassembling the aggregated displacements, although with a slight latency not noticeable to the human eye.

Figures 5A, 5B:
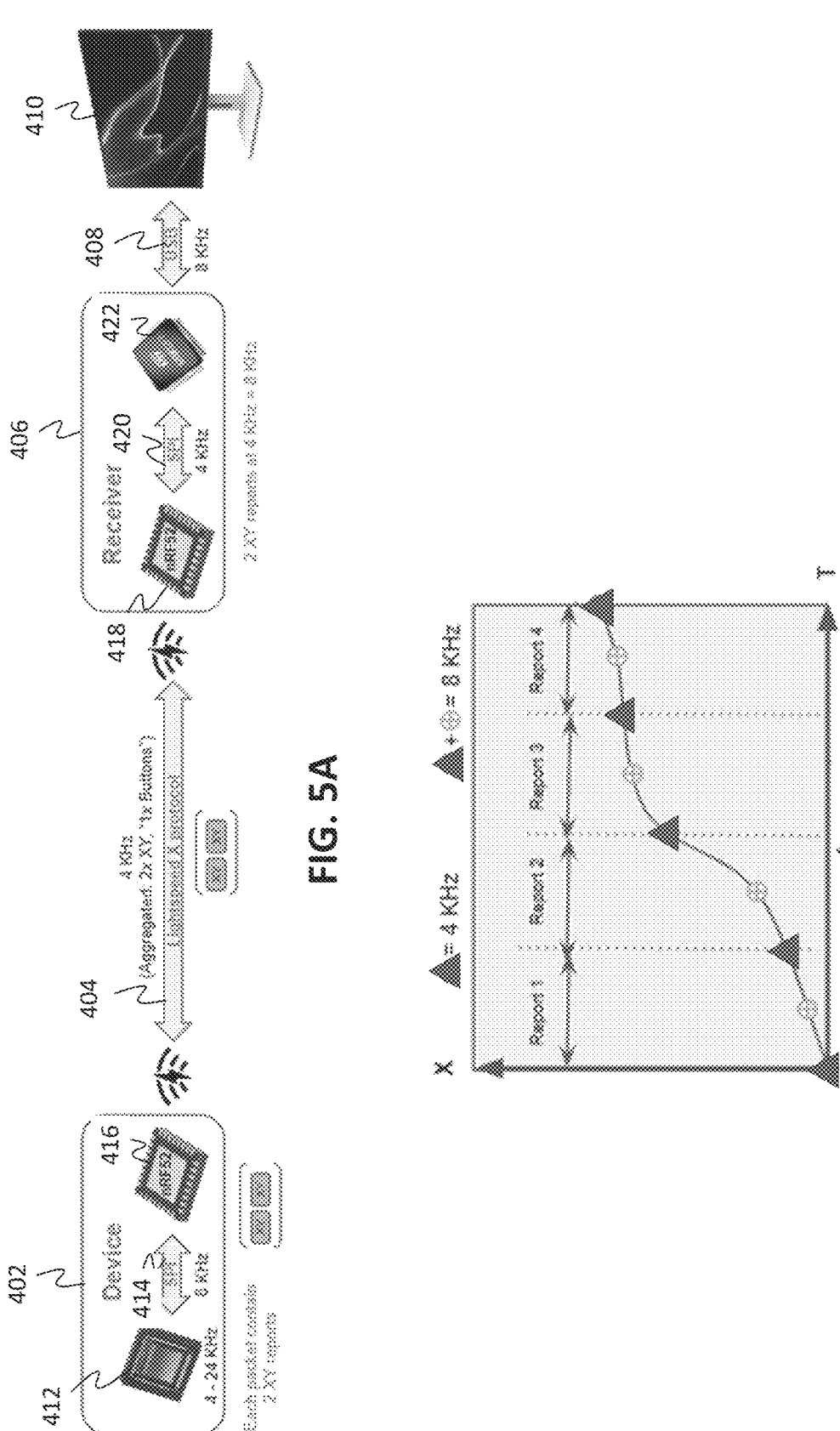
FIGS. 5A-B are diagrams illustrating 2 displacements in a packet, according to certain embodiments.

FIGS. 5A-B are diagrams illustrating 2 displacements in a packet, according to certain embodiments. In FIG. 5A, the same physical system is used, by only two displacements are aggregated in each packet, rather than the four in the embodiment of FIG. 4A. Thus, the 8 KHz sampling rate is converted into a 4 KHz transmission rate. Receiver 406 receives the packets at 4 KHz and forwards them at 4 KHz to a processor 422. Processor 422 disassembles the individual displacements and sends them over a USB bus 408 to host 410 at the original sampling rate of 8 KHz.

Because the mouse sampling rate is not changed, and the rate provided to the host after disassembly is not changed, the protocol described herein is backward compatible with legacy systems.

FIG. 5B is a graph of displacement (X) versus time (T) for the embodiment of FIG. 5A. The triangles represent the 4 KHz transmissions of 2 aggregated displacements which are represented by the circles. If the 4 KHz signal was sent to the display, there would be a larger, straight line movement between the triangles. By disassembling, there are more movements, with each being smaller, and there are two segments instead of one, to more truly follow the curve of the actual displacement device. Thus, a more fluid movement is provided to the display by disassembling the aggregated displacements, although with a slight latency not noticeable to the human eye.

Variable Size Packet

In addition to aggregating displacements, a variable size packet can be used. For example, if four displacements are aggregated in an embodiment, and only one displacement is detected in four periods, the packet size can be reduced to have only a single displacement field. If all 4 displacements are detected, four displacement fields are used. Alternately, displacement fields with zeros are sent, but with the zeros being a small bit field.

FIGS. 6A-E illustrates the fields of various packet types for an aggregated computer mouse packet with two displacements combined (X1, Y1 and X2, Y2). The Type field is an identifier of the packet (indicating an aggregated packet). The Mask field is a bitfield which indicates which parameters of the mouse reports are present or not, and for the X/Y displacements it indicates which format is used. The Mask field indicates how internally aggregated reports have been arranged (for instance to skip null reports, that do not contain information). It will also indicate if there is a displacement of the vertical or horizontal roller and if a button is present. For example, a 0 can indicate that 4 bits are used for displacement, a 1 can indicate 8 bits, a 2 can indicate 12 bits and a 3 can indicate 16 bits. Since most displacements in each sampling period are small, usually only 4 bits are needed for each of the X and Y directions. Since multiple displacements are aggregated, often both displacements only need 4 bits. However, sometimes one displacement will be larger, and require more bits. The Mask field will indicate the number of bits for each displacement. Since this can vary, the size of the packet will vary, avoiding a waste of battery power and bandwidth with empty fields.

Figures 6A, 6B, 6C, 6D, 6E:
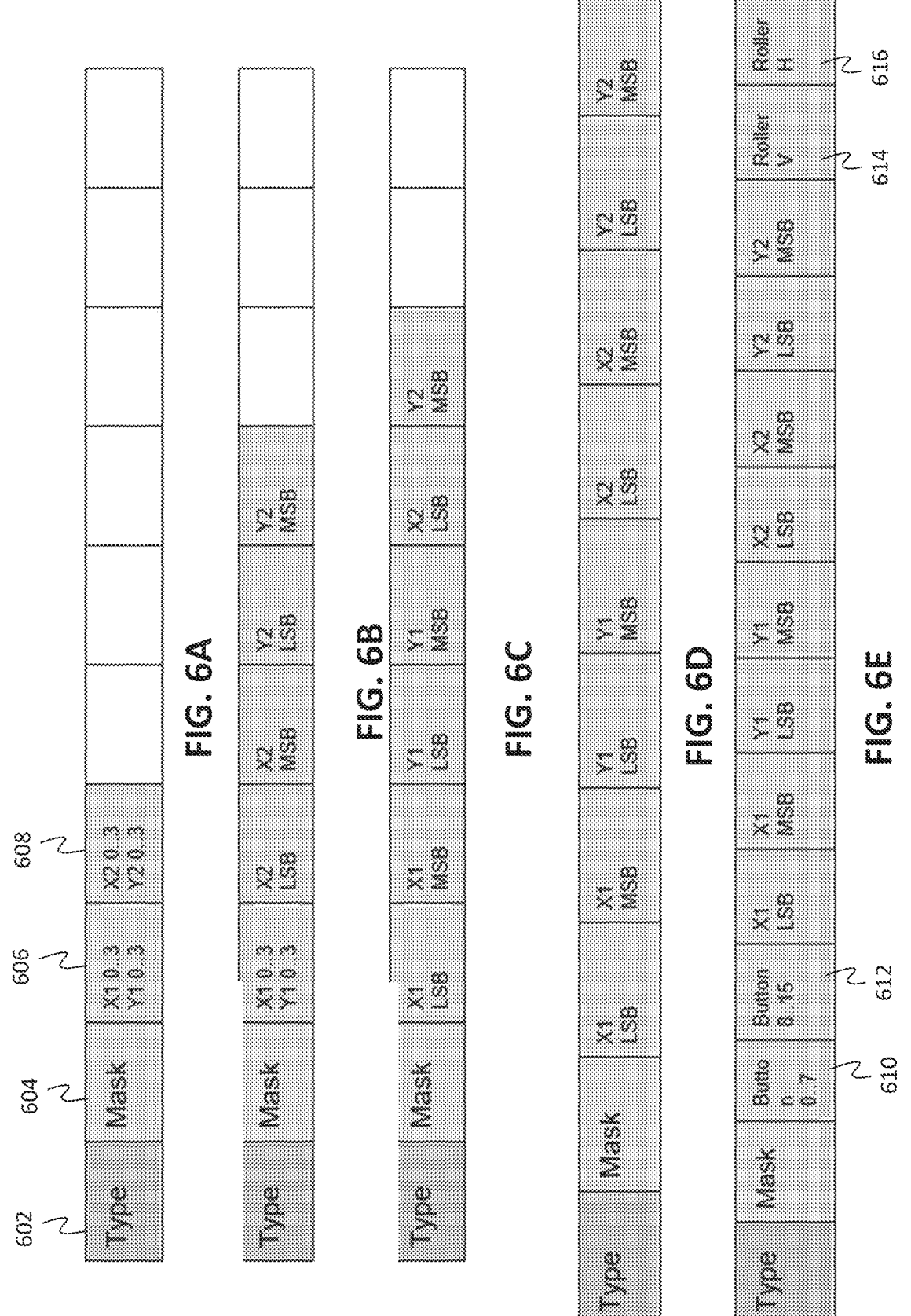
FIGS. 6A-E are diagrams illustrating reduced size packets, according to certain embodiments.

FIG. 6A illustrates a packet with a type field 602, a mask field 604, and two payload fields 606 and 608. Field 606 has 8 bits for the first aggregated displacement, with 4 bits for the X movement and 4 bits for the Y movement. Similarly, field 608 has 8 bits for the second displacement. The remaining fields are empty, and are thus eliminated, with final payload field 608 being followed by a MIC and CRC fields as shown in FIGS. 2A-B.

FIG. 6B illustrates a packet with 8 bits for the first displacement, but with 32 bits for the second displacement. The $X_2$ displacement has a Most Significant Byte (MSB) followed by a Least Significant Byte (LSB). Similarly, Y2 has MSB and LSB fields.

FIG. 6C illustrates a packet that is basically the opposite of the packet of FIG. 6B. There are only 8 bits for the second displacement (X2, Y2), but 32 bits for the first displacement (X1, Y1). The X1 displacement has a Most Significant Byte (MSB) followed by a Least Significant Byte (LSB). Similarly, Y1 has MSB and LSB fields.

FIG. 6D illustrates a packet that has 32 bits for both the first displacement (X1, Y1) and the second displacement (X2, Y2).

FIG. 6E illustrates a packet with the 32 bits for both displacements, as in FIG. 6D, but also adding two button fields 610 and 612, along with a field 614 for vertical roller movement and a field 616 for horizontal roller movement. Alternately, a packet with a single button field or single roller field could be used. With such a structure, in the rare case that a second button or key activation is detected in a same time period, either the two-button field packet could be used, or the second button can be held for a subsequent packet for transmission to the receiver, such that only a single button or key activation is included in each packet, limiting packet size. In one embodiment, the button fields are 8 bits, which identify which button was activated. A smaller number of bits can be used when only two buttons are present.

In practice, the field of FIG. 6A is all that is needed for the vast majority of packets, typically over 95%. Thus, a significant savings in power and bandwidth is achieved by combining the variable length packets illustrated in FIGS. 6A-E with the aggregation of displacements, so that fewer packets are sent. This results in fewer packets, and smaller packets.

Redundancy

Figure 8:
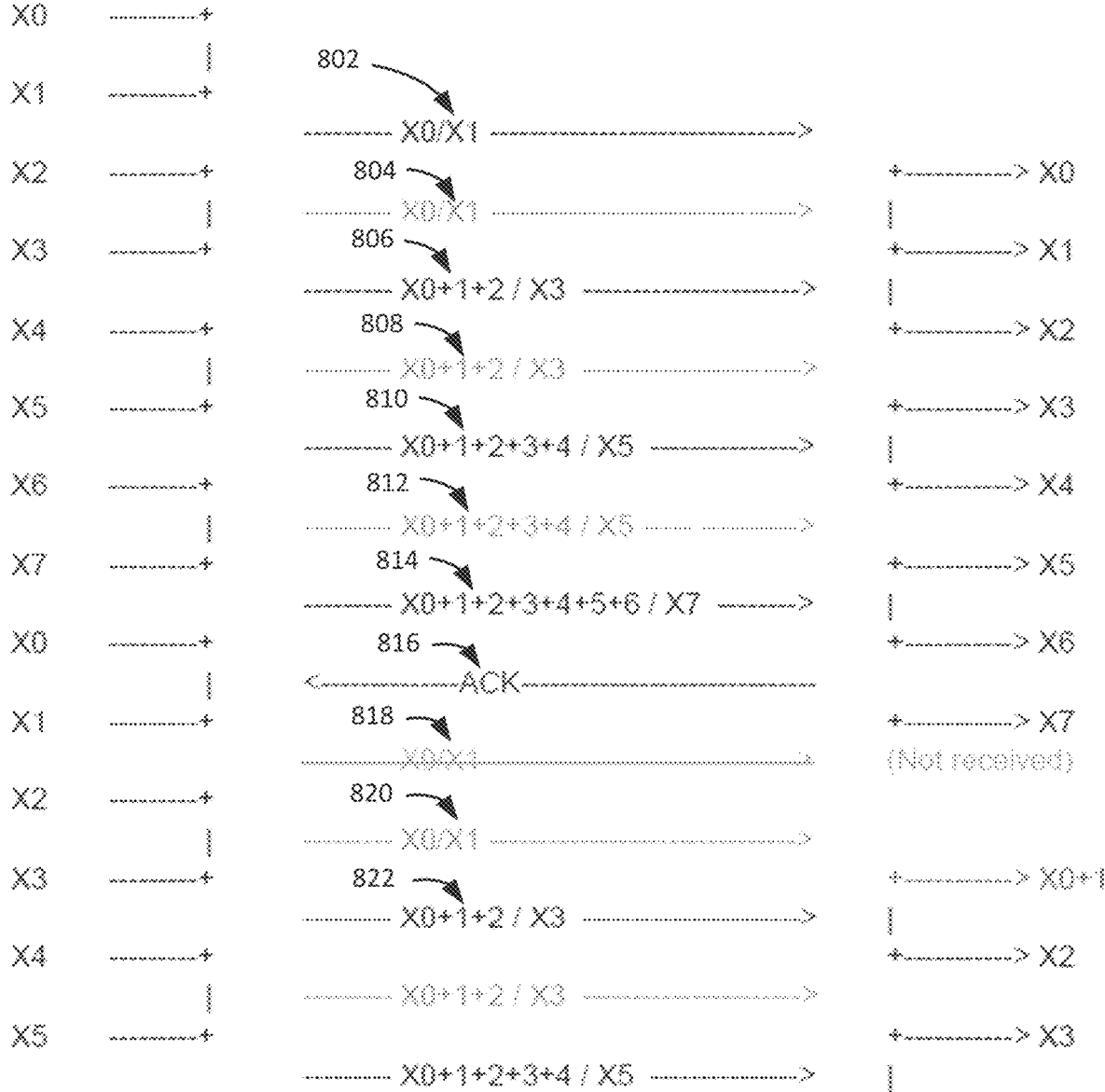
FIG. 8 is a diagram illustrating the aggregation and dissembling of displacements in packets, with two displacements per packet plus redundancy, according to certain embodiments.

FIGS. 7-8 show embodiments which add redundancy to the packets, allowing fewer acknowledgements (ACKs) to be sent, thus further limiting the bandwidth and battery power used.

FIG. 7 is a diagram illustrating the aggregation and dissembling of displacements in packets, with two displacements per packet, according to certain embodiments. A sensor in the mouse sends a displacement X0 followed by a displacement X1. The mouse aggregates X0/X1 into a packet 702 and transmits to a receiver, which then disassembles the displacements and sends them sequentially as X0 then X1, just as they were detected by the sensor.

In this embodiment, a second packet 704 not only includes the subsequent displacements X2 and X3, it also resends X0 and X1. Similarly, Packets 706 and 708 send the new set of two displacements, plus the previous displacements. After 8 displacements have been sent, an acknowledgment 712 is returned to the mouse. Thus, instead of an acknowledgement after every packet, an ACK is only sent after every fourth packet. The process repeats with packets 712, 714, 716, etc. In the example shown, packet 712 is not received by the receiver, and the mouse is not expecting an ACK, and thus does not resend it. However, since the X0/X1 displacements are repeated in the subsequent packets 714, 716, the receiver does not lose the X0, X1 data. If no ACK is received after a 4$^{th}$ packet, the mouse will be expecting it then, and will resend the 4$^{th}$ packet, which has all the displacement data since the last ACK.

FIG. 8 is a diagram illustrating the aggregation and dissembling of displacements in packets, with two displacements per packet plus redundancy, according to certain embodiments. In the embodiment of FIG. 8, the previous displacement data is not only resent, as in FIG. 7, but each packet is also repeated twice, providing additional redundancy. Packet 802 with X0/X1 is repeated as packet 804. Similarly, Packet 806 repeats as packet 808, packet 810 repeats as packet 812. Packet 814 does not repeat. Packet 814 requests an acknowledgment from the dongle, so there is no need to duplicate the packet if an ACK is received. If the ACK is not received the packet will be repeated. Since an ACK is expected to be received, a second packet is not sent to avoid the risk of a collision with it. All the other packets from 802 up to 812 are sent without requesting an ACK. As a broadcast packet, these are repeated to improve the link robustness. An acknowledgement 816 is sent after each 7 packets. As illustrated, if a packet 818 is not received, the displacement data is redundantly provided in a duplicate packet 820, as well as subsequent packets 822, etc.

Alternately, the duplicate packets could be sent with only the two displacements in that period, not with the accumulated displacements. The amount of redundancy used could be varied based on the amount of interference (e.g., other peripherals) detected in the area.

Flowchart

FIG. 9 is a flowchart illustrating a method of aggregating and dissembling displacements in packets, according to certain embodiments. Step 902 is detecting, by the displacement input device, a plurality of displacements in time periods of a first frequency. Step 904 is wirelessly transmitting, from the displacement input device to the receiver, the plurality of displacements aggregated in packets at a second frequency, wherein the second frequency is lower than the first frequency. Step 906 is wirelessly receiving, at the receiver, the plurality of displacements aggregated in packets. Step 908 is buffering the plurality of displacements aggregated in packets in a memory coupled to the receiver. Step 910 is transmitting, by the receiver, to a host, the plurality of displacements at the first frequency.

Peripheral Device

Figure 10:
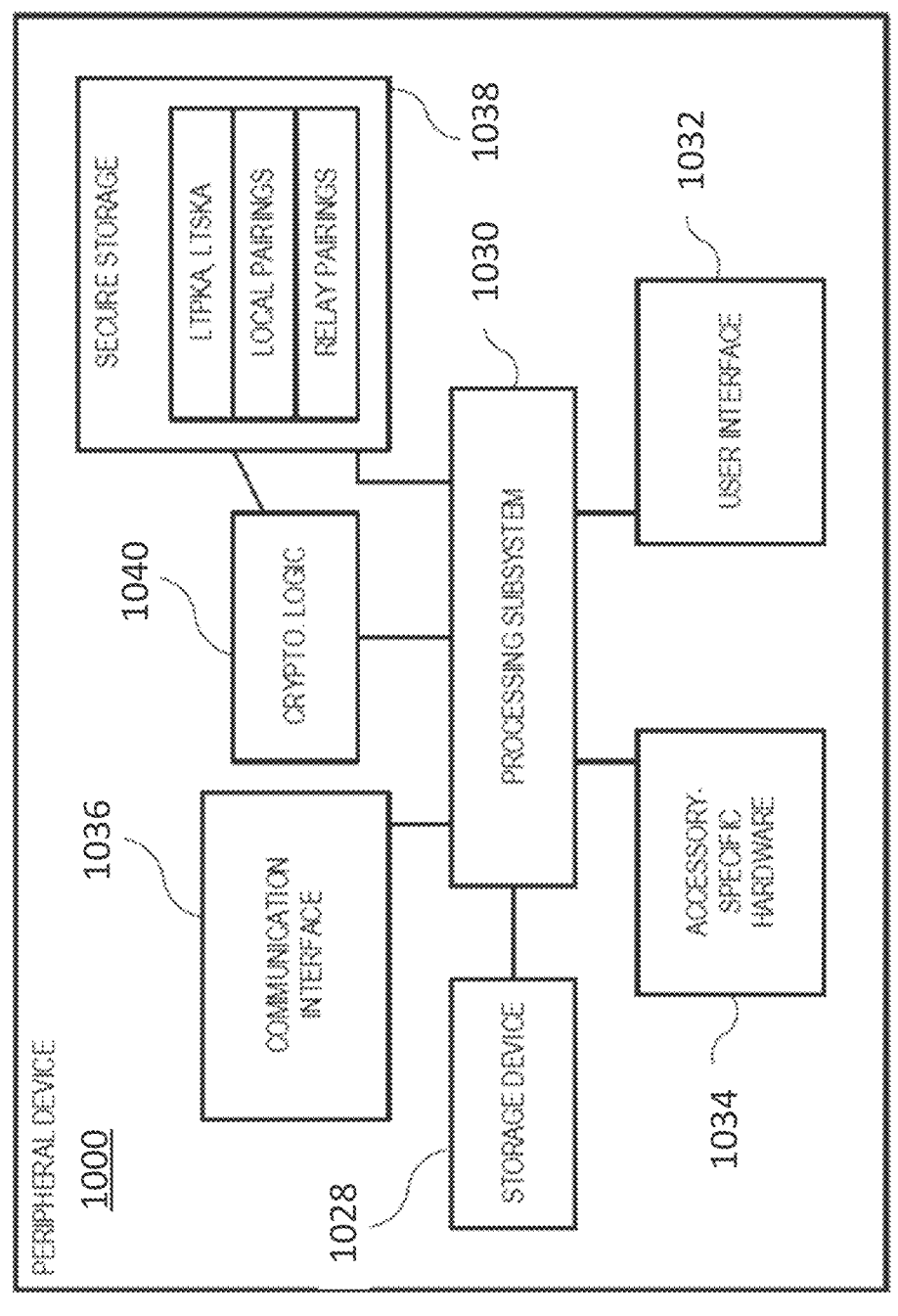
FIG. 10 shows a simplified block diagram of an example HID peripheral device, according to certain embodiments.

FIG. 10 shows a simplified block diagram of an example HID peripheral device 1000, according to certain embodiments. Peripheral device 1000 can implement any or all of the peripheral device functions, behaviors, and capabilities described herein, as well as other functions, behaviors, and capabilities not expressly described. Peripheral device 1000 can include storage device 1028, processing subsystem 1030, user interface 1032, peripheral device-specific hardware 1034, communication interface 1036, secure storage module 1038, and cryptographic logic module 1040. Peripheral device 1000 can also include other components (not explicitly shown) such as a battery, power media access devices, and other components operable to provide various enhanced capabilities.

Peripheral device 1000 is representative of a broad class of devices that can be used in conjunction with a host device and include displacement data, such as but not limited to mice, keyboards with scrolling wheels and/or cursor buttons, trackballs, gamepads, steering wheels, remote controls, pointing devices, digital pens and the like. Various accessories may include components not explicitly shown in FIG. 10, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1028 can be implemented, e.g., using disk, flash memory, or any other non-transitory storage medium, or a combination of media, and can include volatile and/or non-volatile media. In some embodiments, storage device 1028 can store one or more programs (e.g., firmware) to be executed by processing subsystem 1030, including programs to implement various operations described above as being performed by a peripheral device, as well as operations related to particular peripheral device behaviors. Storage device 1028 can also store a peripheral device object or peripheral device definition record that can be furnished to host devices, e.g., during device discovery. Storage device 1028 can also store peripheral device state information and any other data that may be used during operation of peripheral device 1000. Storage device 1028 can also store program code executable to communicate with a transceiver 120, as shown in FIG. 1, e.g., as described above.

Processing subsystem 1030 can include, e.g., one or more single-core or multi-core microprocessors and/or microcontrollers executing program code to perform various functions associated with peripheral device 1000. For example, processing subsystem 1030 can implement various processes (or portions thereof) described above as being implemented by a peripheral device, e.g., by executing program code stored in storage device 1028. Processing subsystem 1030 can also execute other programs to control other functions of peripheral device 1000. In some instances programs executed by processing subsystem 1030 can interact with a host, e.g., by generating messages to be sent to the host and/or receiving messages from the host. In some instances, the messages can be sent and/or received using a transceiver 120, as shown in FIG. 1, as described above.

User interface 1032 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular peripheral device 1000, a user can operate input devices of user interface 1032 to invoke functionality of peripheral device 1000 and can view and/or hear output from peripheral device 1000 via output devices of user interface 1032. Some accessories may provide a minimal or no user interface. Where the peripheral device does not have a user interface, a user can still interact with the peripheral device using a host (e.g., host 1100).

Peripheral device-specific hardware 1034 can include any other components that may be present in peripheral device 1000 to enable its functionality. For example, in various embodiments peripheral device-specific hardware 1034 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of peripheral device functionality can be supported by providing appropriate peripheral device-specific hardware 1034 and that peripheral device-specific hardware can include mechanical as well as electrical or electronic components.

Communication interface 1036 can provide voice and/or data communication capability for peripheral device 1000. In some embodiments communication interface 1036 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1036 can provide wired network connectivity (e.g., Ethernet) in addition to or instead of a wireless interface. Communication interface 1036 can be implemented using a combination of hardware (e.g., driver circuits, antennas, modulators/demodulators, encoders/decoders, and other analog and/or digital signal processing circuits) and software components. In some embodiments, communication interface 1036 can support multiple communication channels concurrently or at different times, using the same transport or different transports. Thus, for example, peripheral device 1000 can communicate with a host via a local channel at some times and via a relay service at other times.

Secure storage module 1038 can be an integrated circuit or the like that can securely store cryptographic information for peripheral device 1000. Examples of information that can be stored within secure storage module 1038 include the peripheral device's long-term public and secret keys (LTPKA, LTSKA), a list of local pairings (e.g., a lookup table that maps a local host identifier to a host long-term public key (LTPKC) for hosts that have completed a local pair setup or pair add process, e.g., as described above, with peripheral device 1000), and a list of relay pairings (e.g., host Ras and associated access tokens for hosts that have established a relay pairing, e.g., as described above, with peripheral device 1000). In some embodiments, pairing information can be stored such that a local pairing is mapped to the corresponding relay pairing in instances where both a local pairing and a relay pairing with the host have been established. In some embodiments, secure storage module 1038 can be omitted; keys and lists of paired hosts can be stored in storage device 1028.

In some embodiments, cryptographic operations can be implemented in a cryptographic logic module 1040 that communicates with secure storage module 1038. Physically, cryptographic logic module 1040 can be implemented in the same integrated circuit with secure storage module 1038 or a different integrated circuit (e.g., a processor in processing subsystem 1030) as desired. Cryptographic logic module 1040 can include various logic circuits (fixed or programmable as desired) that implement or support cryptographic operations of peripheral device 1000, including any or all cryptographic operations described above. Secure storage module 1038 and/or cryptographic logic module 1040 can appear as a "black box" to the rest of peripheral device 1000. Thus, for instance, communication interface 1036 can receive a message in encrypted form that it cannot decrypt and can simply deliver the message to processing subsystem 1030. Processing subsystem 1030 may also be unable to decrypt the message, but it can recognize the message as encrypted and deliver it to cryptographic logic module 1040. Cryptographic logic module 1040 can decrypt the message (e.g., using information extracted from secure storage module 1038) and determine what information to return to processing subsystem 1030. As a result, certain information can be available only within secure storage module 1038 and cryptographic logic module 1040. If secure storage module 1038 and cryptographic logic module 1040 are implemented on a single integrated circuit that executes code only from an internal secure repository, this can make extraction of the information extremely difficult, which can provide a high degree of security. Other implementations are also possible.

Peripheral device 1000 can be any electronic apparatus that interacts with host 1100. In some embodiments, host 1100 can provide remote control over operations of peripheral device 1000 as described below. For example, host 1100 can provide a remote user interface for peripheral device 1000 that can include both input and output controls (e.g., a display screen to display current status information obtained from peripheral device 1000 and an input control such as a touchscreen overlay to allow changes to the status information). Host 1100 in various embodiments can control any function of peripheral device 1000 and can also receive data from peripheral device 1000, via a transceiver 120, as shown in FIG. 1.

Host

Figure 11:
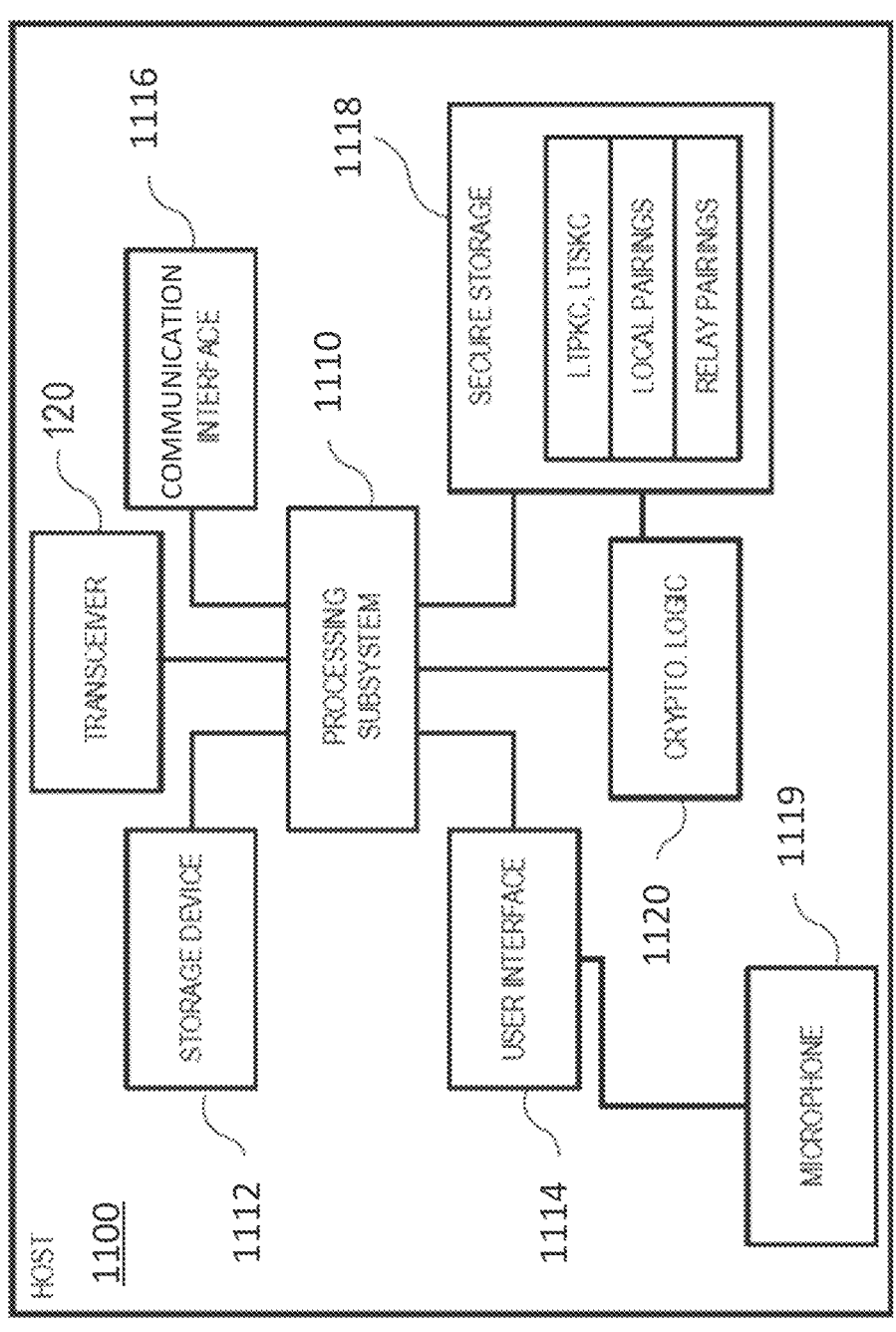
FIG. 11 shows a simplified block diagram of an example host, according to certain embodiments.

FIG. 11 shows a simplified block diagram of an example host 1100, according to certain embodiments. In some embodiments, host 1100 can implement any or all of the functions, behaviors, and capabilities described herein as being performed by a host, as well as other functions, behaviors, and capabilities not expressly described. Host 1100 can include processing subsystem 1110, storage device 1112, user interface 1114, communication interface 1116, secure storage module 1118, and cryptographic logic module 1120. Host 1100 can also include other components (not explicitly shown) such as a battery, power controllers, and other components operable to provide various enhanced capabilities. In various embodiments, host 1100 can be implemented in a desktop computer, laptop computer, tablet computer, smart phone, other mobile phone, wearable computing device, or other systems having any desired form factor. Further, as noted above, host 1100 can be implemented partly in a base station and partly in a mobile unit that communicates with the base station and provides a user interface. Transceiver 120 of FIG. 1 is shown as part of host 1100, and can be removable, such as in a dongle connected to a USB port.

Storage device 1112 can be implemented, e.g., using disk, flash memory, or any other non-transitory storage medium, or a combination of media, and can include volatile and/or non-volatile media. In some embodiments, storage device 1112 can store one or more application and/or operating system programs to be executed by processing subsystem 1110, including programs to implement various operations described above as being performed by a host. For example, storage device 1112 can store a uniform host application that can read a peripheral device description record and generate a graphical user interface for controlling the peripheral device based on information therein. Storage device 1112 can also store program code executable to communicate with a transceiver 120, as shown in FIG. 1, e.g., as described above. Although FIG. 10 illustrates transceiver 120 as a subsystem of host 1100 it is understood that transceiver 120 may be a dongle that is plugged into and electrically coupled with host 1100. Transceiver 120 may contain its own processor for processing received packets as described above, or can be controlled by host processing system 1110 which will perform those functions. In some embodiments, portions (or all) of the host functionality described herein can be implemented in operating system programs rather than applications. In some embodiments, storage device 1112 can also store apps designed for specific accessories or specific categories of accessories (e.g., an IP camera app to manage an IP camera peripheral device or a security app to interact with door lock accessories).

User interface 1114 can include input devices such as a touch pad, touch screen, scroll wheel, click wheel, dial, button, switch, keypad, microphone 1119, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1114 to invoke the functionality of host 1100 and can view and/or hear output from host 1100 via output devices of user interface 1114.

Processing subsystem 1110 can be implemented as one or more integrated circuits, e.g., one or more single-core or multi-core microprocessors or microcontrollers, examples of which are known in the art. In operation, processing system 1110 can control the operation of host 1100. In various embodiments, processing subsystem 1110 can execute a variety of programs in response to program code and can maintain multiple concurrently executing programs or processes. At any given time, some or all of the program code to be executed can be resident in processing subsystem 1110 and/or in storage media such as storage device 1112.

Through suitable programming, processing subsystem 1110 can provide various functionality for host 1100. For example, in some embodiments, processing subsystem 1110 can implement various processes (or portions thereof)

described above as being implemented by a host. Processing subsystem 1110 can also execute other programs to control other functions of host 1100, including application programs that may be stored in storage device 1112. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a transceiver 120, as shown in FIG. 1, as described above.

Communication interface 1116 can provide voice and/or data communication capability for host 1100. In some embodiments communication interface 1116 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1116 can provide wired network connectivity (e.g., Ethernet) in addition to or instead of a wireless interface. Communication interface 1116 can be implemented using a combination of hardware (e.g., driver circuits, antennas, modulators/demodulators, encoders/decoders, and other analog and/or digital signal processing circuits) and software components. In some embodiments, communication interface 1116 can support multiple communication channels concurrently or at different times, using the same transport or different transports. Thus, for example, host 1100 can communicate with accessories via a local channel at some times and via a relay service at other times.

Secure storage module 1118 can be an integrated circuit or the like that can securely store cryptographic information for host 1100. Examples of information that can be stored within secure storage module 1118 include the host's long-term public and secret keys (LTPKC, LTSKC), a list of local pairings (e.g., a lookup table that maps a local peripheral device identifier to a peripheral device long-term public key (LTPKA) for accessories that have completed a local pair setup or pair add process, e.g., as described above, with host 1100), and a list of relay pairings 1126 (e.g., peripheral device Ras and associated access tokens for accessories that have established a relay pairing, e.g., as described above, with host 1100). In some embodiments, pairing information can be stored such that a local pairing 1124 is mapped to the corresponding relay pairing 1126 in instances where both a local pairing and a relay pairing with the peripheral device have been established.

In some embodiments, cryptographic operations can be implemented in a cryptographic logic module 1120 that communicates with secure storage module 1118. Physically, cryptographic logic module 1120 can be implemented in the same integrated circuit with secure storage module 1118 or a different integrated circuit (e.g., a processor in processing subsystem 1110) as desired. Cryptographic logic module 1120 can include various logic circuits (fixed or programmable as desired) that implement or support cryptographic operations of host 1100, including any or all cryptographic operations described above. Secure storage module 1118 and/or cryptographic logic module 1120 can appear as a "black box" to the rest of host 1100. Thus, for instance, communication interface 1116 can receive a message in encrypted form that it cannot decrypt and can simply deliver the message to processing subsystem 1110. Processing subsystem 1110 may also be unable to decrypt the message, but it can recognize the message as encrypted and deliver it to cryptographic logic module 1120. Cryptographic logic module 1120 can decrypt the message (e.g., using information extracted from secure storage module 1118) and determine what information to return to processing subsystem 1110. As a result, certain information can be available only within secure storage module 1118 and cryptographic logic module 1120. If secure storage module 1118 and cryptographic logic module 1120 are implemented on a single integrated circuit that executes code only from an internal secure repository, this can make extraction of the information extremely difficult, which can provide a high degree of security. Other implementations are also possible.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 1100 can perform all operations described above as being performed by a media access device and that an implementation of peripheral device 1000 can perform any or all operations described above as being performed by a peripheral device. A proxy, bridge, tunnel, or coordinator can combine components of host 1100 and peripheral device 1000, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Embodiments of the present invention reduce the number of packets and eliminate the overhead of empty fields during the wireless transmission. In addition, a variable reduced size field can be used to provide the displacement data. A USB transceiver (e.g., transceiver 120 of FIG. 1) connected to a computer can convert received packets back into a standard format by adding back the eliminated fields. The reduced size fields can be restored to their standard length. Thus, this system is backward compatible with software and firmware expecting a standard packet, while at the same time reducing the size of the wireless transmissions.

These embodiments require more processing to convert from the reduced size packets back to the standard packets. However, this processing is mainly done in the transceiver connected to computer power, and does not require battery power from the input device. Processing done in the input device processor consumes less power than the transceiver transmissions. Thus, a trade-off is made to achieve less battery drain and reduced wireless bandwidth requirements.

These embodiments provide multiple advantages. Battery life is improved since less data is transmitted, thus lessening the time the transceiver needs to be transmitting and drawing power. The bandwidth is improved at the same mouse polling rate. Alternately, a higher mouse polling rate is possible. There is more robustness to interference since the packets are shorter, and thus there is less risk of collision with interfering transmissions.

ALTERNATE EMBODIMENTS

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for wireless communications between a displacement input device and a receiver, the method comprising:

detecting, by the displacement input device, a plurality of displacements in time periods of a first frequency;

wirelessly transmitting, from the displacement input device to the receiver, the plurality of displacements aggregated in packets at a second frequency, wherein the second frequency is lower than the first frequency;

wirelessly receiving, at the receiver, the plurality of displacements aggregated in packets;

buffering the plurality of displacements aggregated in packets in a memory coupled to the receiver;

transmitting, by the receiver, to a host, the plurality of displacements at the first frequency.

2. The method of claim 1 wherein there are between two and eight displacements in each packet.

3. The method of claim 2 wherein there are two, four or eight displacements in each packet.

4. The method of claim 1 further comprising:

detecting, by the displacement input device, a button or key activation in a time periods of the second frequency;

wirelessly transmitting, from the displacement input device to the receiver, the button or key activation in packets at the second frequency;

wirelessly receiving, at the receiver, the button or key activation; and transmitting, by the receiver, to the host, the button or key activation at the same time as a first displacement of the aggregated displacements.

5. The method of claim 4 further comprising:

detecting, by the displacement input device, a second button or key activation in a same time period of the second frequency as the first button or key activation; and holding the second button or key activation for a subsequent packet for transmission to the receiver, such that only a single button or key activation is included in each packet.

6. The method of claim 1 further comprising:

when only displacement data is detected in a period of time, generating a reduced-size packet with the displacement data while eliminating packet fields corresponding to the other input data;

wirelessly transmitting, from the displacement input device to the receiver, the reduced-size packet;

when button or key or other input data is detected in the period of time, generating an other input data packet with a packet field for the button or key or other input data; and wirelessly transmitting, from the displacement input device to the receiver, the other input data packet.

7. The method of claim 1 further comprising:

when only displacement data is detected in a first period of time, generating a no-acknowledgement packet with the displacement data and an indication that no acknowledgement should be sent;

wirelessly transmitting, from the displacement input device to the receiver, the no-acknowledgement packet;

transmitting accumulated displacement data in subsequent periods of time when only displacement data is detected, such that an $n^{th}$ period of time no-acknowledgement packet includes first displacement data from the first period of time and all displacement data up to the $n^{th}$ period of time; and at a threshold number of periods of time with only displacement data, transmitting an acknowledgment request.

8. The method of claim 1 wherein the displacement input device is one of a computer mouse, a trackball, a joystick, a gamepad, a steering wheel or a touchpad.

9. The method of claim 1, wherein the displacements include at least one of x-y displacement data, z-displacement data, wheel rotation data, trackball rotation data, joystick or mini-joystick data, D-pad data, accelerometer data or tilt sensor data.

10. The method of claim 1 further comprising:

transmitting duplicates of the packets at the second frequency to provide redundancy in an event of collisions.

11. A method for wireless communications between a displacement input device and a receiver, the method comprising:

detecting, by the displacement input device, a plurality of displacements in time periods of a first frequency;

wirelessly transmitting, from the displacement input device to the receiver, the plurality of displacements aggregated in packets at a second frequency, wherein the second frequency is lower than the first frequency;

wirelessly receiving, at the receiver, the plurality of displacements aggregated in packets;

buffering the plurality of displacements aggregated in packets in a memory coupled to the receiver;

transmitting, by the receiver, to a host, the plurality of displacements at the first frequency; detecting, by the displacement input device, a button or key activation in a time periods of the second frequency;

wirelessly transmitting, from the displacement input device to the receiver, the button or key activation in packets at the second frequency;

wirelessly receiving, at the receiver, the button or key activation;

transmitting, by the receiver, to the host, the button or key activation at the same time as a first displacement of the aggregated displacements;

detecting, by the displacement input device, a second button or key activation in a same time period of the second frequency as the first button or key activation; and holding the second button or key activation for a subsequent packet for transmission to the receiver, such that only a single button or key activation is included in each packet;

when only displacement data is detected in a period of time, generating a reduced-size packet with the displacement data while eliminating packet fields corresponding to the other input data;

wirelessly transmitting, from the displacement input device to the receiver, the reduced-size packet;

when button or key or other input data is detected in the period of time, generating an other input data packet with a packet field for the button or key or other input data;

wirelessly transmitting, from the displacement input device to the receiver, the other input data packet;

when only displacement data is detected in a first period of time, generating a no-acknowledgement packet with the displacement data and an indication that no acknowledgement should be sent;

wirelessly transmitting, from the displacement input device to the receiver, the no-acknowledgement packet;

transmitting accumulated displacement data in subsequent periods of time when only displacement data is detected, such that an $n^{th}$ period of time no-acknowledgement packet includes first displacement data from the first period of time and all displacement data up to the $n^{th}$ period of time; and at a threshold number of periods of time with only displacement data, transmitting an acknowledgment request.

12. A system for wireless communications between a displacement input device and a receiver, the system comprising:

a displacement input device;

a displacement input device transceiver mounted in the displacement input device;

a displacement input device processor mounted in the displacement input device;

a displacement data input mechanism mounted in the displacement input device;

an other data input mechanism mounted in the displacement input device;

a displacement input device memory coupled to the displacement input device processor, the displacement input device memory including non-transitory computer readable medium having stored thereon software instructions that, when executed by the displacement input device processor, cause the displacement input device processor to execute steps comprising:

detecting, by the displacement input device, a plurality of displacements in time periods of a first frequency; and wirelessly transmitting, from the displacement input device to the receiver, the plurality of displacements aggregated in packets at a second frequency, wherein the second frequency is lower than the first frequency.

13. The system of claim 12 further comprising:

a host transceiver in communication with a host;

a host transceiver processor;

a host transceiver memory coupled to the host transceiver processor, the host transceiver memory including non-transitory computer readable medium having stored thereon software instructions that, when executed by the host transceiver processor, cause the host transceiver processor to execute the steps comprising:

wirelessly receiving, at the receiver, the plurality of displacements aggregated in packets;

buffering the plurality of displacements aggregated in packets in a memory coupled to the receiver; and transmitting, by the receiver, to a host, the plurality of displacements at the first frequency.

14. The system of claim 12 wherein the displacement data includes at least one of x-y displacement data, horizontal or vertical wheel rotation data and cursor button data.

15. The system of claim 12 wherein the displacement data includes at least one of joystick or mini-joystick data, D-pad data, accelerometer data, tilt sensor data, and steering wheel angle data.

16. The system of claim 13 wherein the displacement input device memory non-transitory computer readable medium further has stored thereon software instructions that, when executed by the displacement input device processor, cause the displacement input device processor to execute steps comprising:

detecting, by the displacement input device, a button or key activation in a time periods of the second frequency;

wirelessly transmitting, from the displacement input device to the receiver, the button or key activation in packets at the second frequency;

wherein the host transceiver memory non-transitory computer readable medium further has stored thereon software instructions that, when executed by the host transceiver processor, cause the host transceiver processor to execute the steps comprising:

wirelessly receiving, at the receiver, the button or key activation; and transmitting, by the receiver, to the host, the button or key activation at the same time as a first displacement of the aggregated displacements.

17. The system of claim 12 wherein the displacement input device memory non-transitory computer readable medium further has stored thereon software instructions that, when executed by the displacement input device processor, cause the displacement input device processor to execute steps comprising:

detecting, by the displacement input device, a second button or key activation in a same time period of the second frequency as the first button or key activation; and holding the second button or key activation for a subsequent packet for transmission to the receiver, such that only a single button or key activation is included in each packet.

18. The system of claim 12 wherein the displacement input device memory non-transitory computer readable medium further has stored thereon software instructions that, when executed by the displacement input device processor, cause the displacement input device processor to execute steps comprising:

when only displacement data is detected in a period of time, generating a reduced-size packet with the displacement data while eliminating packet fields corresponding to the other input data;

wirelessly transmitting, from the displacement input device to the receiver, the reduced-size packet;

when button or key or other input data is detected in the period of time, generating an other input data packet with a packet field for the button or key or other input data; and wirelessly transmitting, from the displacement input device to the receiver, the other input data packet.

19. The system of claim 12 wherein the displacement input device memory non-transitory computer readable medium further has stored thereon software instructions that, when executed by the displacement input device processor, cause the displacement input device processor to execute steps comprising:

when only displacement data is detected in a first period of time, generating a no-acknowledgement packet with the displacement data and an indication that no acknowledgement should be sent;

wirelessly transmitting, from the displacement input device to the receiver, the no-acknowledgement packet;

transmitting accumulated displacement data in subsequent periods of time when only displacement data is detected, such that an $n^{th}$ period of time no-acknowledgement packet includes first displacement data from the first period of time and all displacement data up to the $n^{th}$ period of time; and at a threshold number of periods of time with only displacement data, transmitting an acknowledgment request.

20. The system of claim 12 wherein there are between two and eight displacements in each packet.

* * * * *